United States Patent
Mittig et al.

(10) Patent No.: US 10,757,118 B2
(45) Date of Patent: Aug. 25, 2020

(54) METHOD OF AIDING THE DETECTION OF INFECTION OF A TERMINAL BY MALWARE

(71) Applicant: ORANGE, Paris (FR)

(72) Inventors: Karel Mittig, Caen (FR); Fabien Bignon, Rosel (FR)

(73) Assignee: ORANGE, Paris (FR)

( * ) Notice: Subject to any disclaimer, the term of this patent is extended or adjusted under 35 U.S.C. 154(b) by 155 days.

(21) Appl. No.: 15/769,579

(22) PCT Filed: Oct. 10, 2016

(86) PCT No.: PCT/FR2016/052614
§ 371 (c)(1),
(2) Date: Apr. 19, 2018

(87) PCT Pub. No.: WO2017/068261
PCT Pub. Date: Apr. 27, 2017

(65) Prior Publication Data
US 2018/0316697 A1 Nov. 1, 2018

(30) Foreign Application Priority Data
Oct. 19, 2015 (FR) .................... 15 59947

(51) Int. Cl.
*H04L 29/06* (2006.01)
*G06F 21/56* (2013.01)
*G06F 21/55* (2013.01)

(52) U.S. Cl.
CPC ........ *H04L 63/1416* (2013.01); *G06F 21/552* (2013.01); *G06F 21/566* (2013.01);
(Continued)

(58) Field of Classification Search
CPC .................................................. H04L 63/1416
See application file for complete search history.

(56) References Cited

U.S. PATENT DOCUMENTS 6,192,408 B1 * 2/2001 Vahalia ............... G06F 16/1774
709/229
8,055,767 B1 11/2011 Forristal
(Continued)

FOREIGN PATENT DOCUMENTS

| CN | 102684874 A | * | 9/2012 |
| CN | 103383665 A | * | 11/2013 |
| CN | 104219230 A | * | 12/2014 |

OTHER PUBLICATIONS

International Search Report dated Nov. 29, 2016 for corresponding International Application No. PCT/FR2016/052614, filed Oct. 10, 2016.
(Continued)

*Primary Examiner* — Shawnchoy Rahman
(74) *Attorney, Agent, or Firm* — David D. Brush; Westman, Champlin & Koehler, P.A.

(57) ABSTRACT

A method for aiding detection of infection of a terminal by malware. The method includes: reception of a current request originating from the terminal asking for access to a resource of a network; detection that the resource requested is malevolent; when the current request includes a reference to an initial resource, verification that access to the initial resource has been requested from the terminal in at least one earlier request, the initial resource having been detected legitimate during processing of the earlier request; and wherein the current request being then considered to be an attempt to infect the terminal.

9 Claims, 2 Drawing Sheets

(52) U.S. Cl.
    CPC .................. *G06F 2221/034* (2013.01); *G06F 2221/2101* (2013.01); *G06F 2221/2119* (2013.01)

(56) References Cited

U.S. PATENT DOCUMENTS

| | | | |
|---|---|---|---|
| 8,286,239 B1 | 10/2012 | Sutton | |
| 9,646,035 B1* | 5/2017 | Dickson | .............. G06F 16/2477 |
| 2004/0243828 A1* | 12/2004 | Aguilera | ................ G06F 21/64 |
| | | | 726/27 |
| 2006/0198525 A1* | 9/2006 | Brey | ....................... H04L 63/06 |
| | | | 380/278 |
| 2009/0028160 A1 | 1/2009 | Eswaran et al. | |
| 2012/0054860 A1* | 3/2012 | Wyschogrod | ..... H04L 29/12066 |
| | | | 726/22 |
| 2014/0373118 A1* | 12/2014 | Doi | ...................... H04L 9/3268 |
| | | | 726/6 |

OTHER PUBLICATIONS

English translation of the International Written Opinion dated Nov. 29, 2016 for corresponding International Application No. PCT/FR2016/052614, filed Oct. 10, 2016.

\* cited by examiner

METHOD OF AIDING THE DETECTION OF INFECTION OF A TERMINAL BY MALWARE

CROSS-REFERENCE TO RELATED APPLICATIONS

This Application is a Section 371 National Stage Application of International Application No. PCT/FR2016/052614, filed Oct. 10, 2016, the content of which is incorporated herein by reference in its entirety, and published as WO 2017/068261 on Apr. 27, 2017, not in English.

FIELD OF THE DISCLOSURE

The present invention relates to a method for assisting the detection of an infection of a terminal by a malware program.

One particularly advantageous application of the invention is in the protection of data processing networks and terminals, notably in the detection of terminals infected by malware programs such as viruses. The terminals may be computers, smartphones, tablets or servers.

BACKGROUND OF THE DISCLOSURE

The infection of data processing terminals by means of malware programs is intended to allow persons of malicious intent, or cybercriminals, to take control of terminals remotely and to extract sensitive data from them such as identifiers, passwords, banking data, etc. Such an infection may take place in several ways: downloading onto the terminal infected files via the Internet, opening email attachments, which in this case is referred to as "phishing". The malware program may also be transmitted by means of a removable medium such as a "USB" (for Universal Serial Bus) stick. The infection may also be as a consequence of the exploitation by the creator of the malware program of a vulnerability of the terminal, for example a flaw in the browser, etc.

Once the terminal is infected by the malware program, it connects to one or more malicious servers situated on the Internet in order to receive commands and/or send information contained in the infected terminal. The majority of the malware programs use the protocol "http" (for "hypertext transfer protocol") which constitutes the majority of the Internet traffic. The malware programs thus generate a malicious traffic which merges into a legitimate traffic and which is furthermore difficult to identify and to isolate.

The usual techniques for detection of a malicious traffic are essentially based on a search within a database of malicious "URL" (for "Uniform Resource Locator") signatures, or black list of malicious URLs. These databases list malicious resources and servers known on the Internet. An attempt to connect from a terminal to one of the resources whose signature is present in the database indicates either the effective presence of a malware program on the terminal or an attempt to infect said terminal.

In order to overcome this type of attack, it is usual to establish a system for monitoring the network traffic which analyzes all of the traffic coming from the terminal in order to identify communications which may be associated with a malware program. Thus, when the terminal generates an http request sent over the Internet, the latter is intercepted by the monitoring system which analyzes the content of the request. If the URL does not appear on the black list, the traffic is not blocked and the software having generated the http request receives in response the requested resource. If the URL included in the request is referenced in the black list of the malicious URLs, the request is blocked and an error message is sent to the terminal. In this case, and in order to combat infections, a warning is raised and sent to a security administrator in order to apply remedial solutions as quickly as possible, such as a targeted anti-virus, a quarantining of the terminal, etc., before the malware program has had the time to do serious damage.

However, such a solution generates many false positives which are detrimental to the administration of the system. A false positive is defined by the generation of an infection alarm for a terminal even though the latter is not infected. Indeed, a large number of accesses to malicious URLs are not linked to the presence of a malware program in the terminal in question, but to redirections and automatic accesses using functionalities of the http protocol and exploited by the attackers to try to infect the terminals in question. For example, an innocent request emanating from a terminal may lead to the uploading onto a server of a page by the browser which may include links or redirections to malicious resources. The addition of these malicious resources may be made by the attacker, for example by exploiting a vulnerability of the web server contacted by the terminal, by hijacked use of advertisements, etc. For example, a user connects to the site "http://downloadmusic1.com/" and their browser connects in an automatic and transparent manner to the malicious server "http://1shot.ru/" subsequent to a redirection by the server contacted. Such an access is seen as indirect because it is subsequent to an access to a legitimate resource of the network, in this case "http://downloadmusic1.com/". The monitoring system analyzes the two requests that emanate from the terminal and generates an alarm for the second request indicating that the terminal is infected. Thus, no distinction is made by the monitoring system between an infection attempt by indirect access and a true infection which involves a direct connection to a malicious site. A security administrator is then obliged to analyze each alarm in order to determine whether the terminal really is infected. This reduces the efficacy and the advantage of an automatic detection for infection of a terminal whenever the infection attempts also give rise to alarms of the same level of criticality as the alarms representative of real infections.

SUMMARY

An exemplary embodiment of the invention provides a method for assisting the detection of infection of a terminal by a malware program, comprising:
  receiving a current request, coming from the terminal, for access to a resource of a network,
  detection that the resource requested is malicious,
  when the current request comprises a reference to an initial resource, verification that an access to the initial resource has been requested from the terminal in at least one prior request, said initial resource having been detected as legitimate during the processing of the prior request, said current request then being considered as an attempt to infect the terminal.

The method for detecting an infection of a terminal thus allows the reliability of the infection detection to be improved by significantly reducing the number of false positives. It is recalled that a false positive corresponds to the generation of an infection alarm even though the terminal is healthy, exempt from any infection. Indeed, the method described allows, from amongst requests relating to resources identified as malicious, those that are linked to an infection of the terminal, and those that are linked to an infection attempt to be distinguished. The infection attempt is characterized by an indirect access to a malicious content, which is the result of a redirection or of the inclusion of a link within a server or a web application. The malicious content is then automatically loaded by the terminal during the access to a page or to a link referencing this content. In this case, it is the server giving rise to the redirection or to the link which may have been a victim of an attack. With the method for assisting the detection, a security administrator who receives infection alarms does not waste time in the analysis of infection attempts. He/she can then react quickly to alarms that correspond to real infections of the terminal in order to avoid the propagation of an attack to other terminals and disastrous effects on the terminal.

An implementation of the invention has allowed more than ninety percent of the alarms to be filtered which corresponded to indirect accesses to malicious resources, and therefore the number of false alarms which, without this method, would have been generated to be very greatly reduced.

In one exemplary embodiment, the method comprises, when the initial resource whose reference is included within the current request has not been requested by the terminal in a prior request during a supervision time interval, transmission of an alarm representative of an infection of the terminal.

In this case, the current request is incoherent with the prior legitimate requests sent from the terminal in the recent past. Indeed, the current request makes reference to an initial resource which appears in the reference field of the header, whereas the initial resource has not been the object of a request from the terminal during this recent past which corresponds to the supervision interval. In this case, it is probable that a cybercriminal has injected a fake reference field into the current request in such a manner as to make it seem that the current request is linked to a prior request sent from the terminal. An alarm therefore needs to be sent, since the current request has been falsified on the terminal.

In one exemplary embodiment, the method comprises, when the resource requested is a legitimate resource, a recording of said resource in association with a current timestamp value representative of a latest date of access to the resource.

A legitimate resource requested from the terminal is associated with a timestamp value representative of the latest date of access to the resource. The timestamp value thus allows a normal time period to be taken into account that separates the generation of successive requests linked via their reference field. For example, in the case of a user surfing the Internet who gains access to a first page from his/her browser, then from this first page to a second page, it is assumed that the time separating the access to these two pages does not exceed a certain duration which, in the method, corresponds to the supervision time interval. The recording of the requested legitimate resources and the inclusion of timestamp values associated with the requests relating to these resources thus allows a time association between requests linked via their reference field to be taken into account.

In one exemplary embodiment, the resource is recorded in a history of requests, the recording of the resource comprising:
application of at least one hash function to a current binary value associated with the resource,
determination of at least one current position in a time-out Bloom filter based on said current binary value, said filter being associated with the terminal and equivalent to the history of the requests, and
recording of the current timestamp value at said current position of the filter.

The example described here includes the use of a time-out Bloom filter in order to manage a history of requests to legitimate resources. Bloom filters are compact data structures, well suited for storing a very large number of data values and for being interrogated on the presence or the absence of a given element in the filter. Thus, Bloom filters allow very advantageous performance characteristics during a real-time implementation of the method for assisting the detection of infection of a terminal by a malware program. The time-out Bloom filter records in one entry of the filter a timestamp value which is here associated with the latest date of access to the legitimate resource which appears in the legitimate request.

Furthermore, the use of a Bloom filter for recording information on the legitimate requests sent from the terminal preserves the anonymity of the users having made the requests. Indeed, the Bloom filters record timestamp values associated with requests, the requests only being used for calculating a position in the filter. Thus, once a position has been calculated in association with a request, no information concerning content of the request is stored in the filter. This aspect is fundamental in order to respect the privacy of the users, notably in the case where the solution for assisting the detection of infection of a terminal is implemented within the network.

In one example of use of the Bloom filter previously described, a search of an initial resource in the filter comprises:
application of the hash function to an initial binary value associated with the initial resource,
determination of at least one position in the Bloom filter based on said initial binary value,
selection, from amongst the at least one position, of the position in the filter which comprises the earliest timestamp value,
when the time period included between the earliest timestamp value and a current date is less than an expiration time associated with the filter, indication that the initial resource appears in the history.

This example describes the steps that are implemented in order to discover whether an initial resource which is referenced in a current request appears in the history of the requests or does not.

In one exemplary embodiment, the Bloom filter is associated with the terminal and with at least one field included in a header of the current request.

In this example, a context specific to the requests sent from the terminal is taken into account for the management of the history. Thus, a history is associated not only with the terminal but also with a context for generation of the requests. The context comprises for example the application responsible for the request, the language in which the terminal wishes to receive a response, etc. The elements of the context are for example fields which may be present in the requests sent from the terminal. Thus, there may be a plurality of histories managed for a single terminal.

This allows a case to be covered where a cybercriminal includes in requests to malicious resources that he/she causes to be generated by the terminal a field referencing a popular resource which has a good chance of being present in the history of the legitimate resources requested from the terminal. This case corresponds to a hijacking of the solution provided by the method in order to remove from the alarms the indirect accesses to malicious resources, and which consists in verifying, when a reference field is present in a current request to a malicious resource, that the resource which appears in the reference field has been previously requested from the terminal.

The invention also relates to a device for assisting the monitoring of a network traffic, configured for assisting the detection of infection of a terminal by a malware program, said device comprising:
  receiving means configured for receiving a current request, coming from the terminal, for access to a resource of a network,
  detection means, configured for detecting that the resource requested is malicious,
  verification means, configured for verifying, when the current request comprises a reference to an initial resource, that the access to the initial resource has been requested from the terminal in at least one prior request, said initial resource having been detected to be legitimate during the processing of the prior request, said current request then being considered as an attempt to infect the terminal.

In one exemplary embodiment, the monitoring assistance device is integrated into a user terminal.

In this example, the monitoring device is integrated into the terminal. This could for example be an antivirus or anti-malware software installed in the terminal.

The invention also relates to a computer program on a data medium and loadable into the memory of a computer, the program comprising portions of code for the execution of the steps of the method for assisting the detection of infection of a terminal by a malware program such as previously described, when the program is executed on said computer.

The invention also relates to a data medium on which the preceding program is recorded.

BRIEF DESCRIPTION OF THE DRAWINGS

Other features and advantages of the present invention will be better understood from the description and from the appended drawings amongst which.

Figure 1:
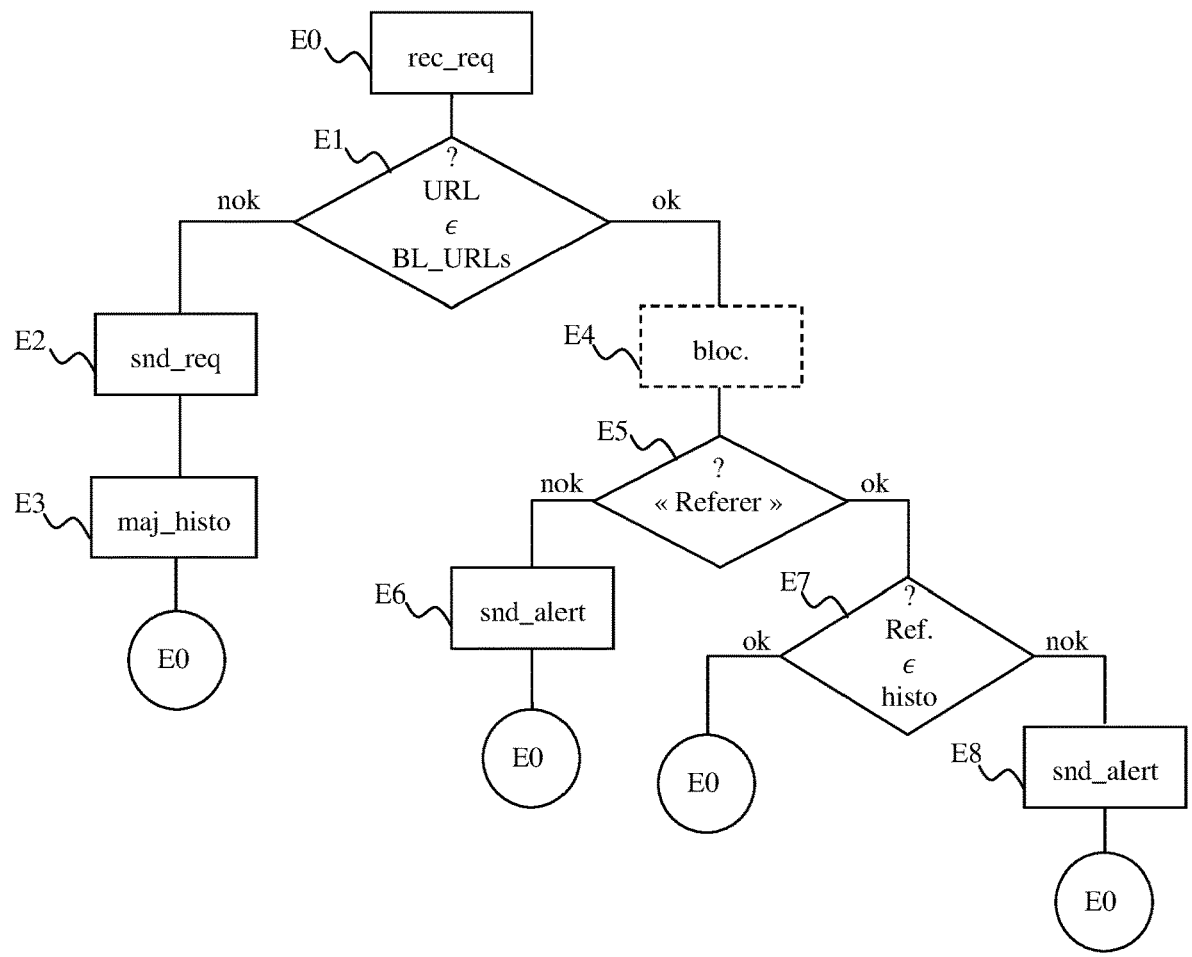
FIG. 1 shows the steps of a method for assisting the detection of infection of a terminal by a malware program, according to one exemplary embodiment.

The steps of a method for assisting the detection of infection of a terminal by a malware program, according to one exemplary embodiment, will now be described in relation to FIG. 1.

A computer terminal (not shown in FIG. 1) is configured for generating requests in order to gain access to resources of a network, for example the Internet. A resource is generally denoted by a uniform resource locator or "URL" (FOR "Uniform Resource Locator") which is usually substituted by a web address. The resources are accessed by means of a client-server communication protocol, for example "http" (for "hypertext transfer protocol"). The most well known http clients are the web browsers which allow access for users, via their terminal, to a server containing data. In the following, a data value supplied by a server, or the server itself, that are concerned by the request are referred to as a resource, or URL. In the example described here, the computer terminal is for example a personal computer of the "PC" ("for "Personal Computer") type, a mobile terminal, a tablet, a "PDA" (for "Personal Digital Assistant"), etc., configured to allow a user to access resources of a data network such as the Internet. In another exemplary embodiment, the computer terminal is a server.

Figure 4:
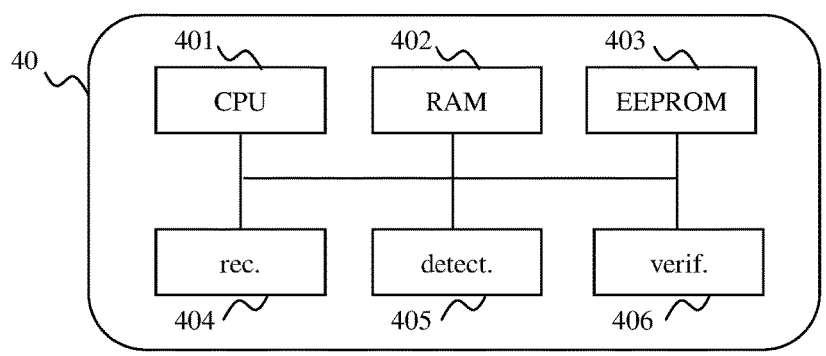
FIG. 4 is a schematic representation of a device for monitoring traffic used for the implementation of the method according to one exemplary embodiment.

A device for monitoring traffic 40 such as shown in FIG. 4 is configured to assist the detection of an infection of the terminal by a malware program. The monitoring device 40 is placed in the flow of traffic between the terminal and the Internet. Thus, any request for resources sent by the terminal over the Internet transits via the monitoring device 40 which intercepts it and analyzes it. It is appropriate to analyze all of the http requests coming from the terminal because the majority of cybercriminals use the http protocol in order to perpetrate attacks by means of malware programs Indeed, since this protocol constitutes the majority of the Internet traffic, the malware programs based on this protocol generate an attack traffic which merges into a legitimate traffic and which is, as a result, difficult to detect and to isolate. The invention is not of course limited to the http protocol and may be applied, with some adaptations, to other protocols.

In an initial step E0 for receiving a request, a current http request, intended to request the access to a current resource on the Internet is sent from the terminal to a server of the network able to deliver the resource. The current request sent out by the terminal is intercepted by the monitoring device 40. The user of the terminal has for example selected a hypertext link in a page displayed in their web browser. For example, they have selected the link "http://downloadmusic1.com/". Aside from the name of the server to be contacted, here "dowloadmusic1.com", the http request comprises, in a header, a set of fields intended to supply to the server, for which the request is intended, complementary information on characteristics of the client application responsible for the request and/or on characteristics of the current resource requested. Thus, a field of the header indicates the name of the client application having generated the request, such as the name of the browser used for sending the request, together with its version number, the languages supported by the client application, the format of the screen, etc. The header may also comprise a reference field, or "Referer" field in the case of the http protocol. The reference field allows an initial reference resource to be indicated to the server from which the current resource has been obtained. In the case of a user browsing the internet and who accesses a web page, if the reference field is filled out, this indicates that the user has followed a link for accessing the page relating to the current resource and the reference field then indicates the link that the user has selected. For example, if the header of the request for access to the server "downloadmusic1.com" comprises "http://google.fr" in the reference field, this indicates that the user has selected the resource "downloadmusic1.com" from the site "google.fr". It should be noted that, in this case, the access relating to the resource "downloadmusic1.com" is referred to as an indirect access. The information contained in the reference field is typically used by a server for identifying third-party sites pointing to its content. This allows the administrator of the server to establish access statistics, optimizations in terms of dimensioning, etc. It should be noted that the reference field is not only present during explicit browsing by a user who, from a first page, selects a link for accessing a second page.

It is also present in requests that are made automatically by the browser for loading for example images or scripts and which are due to redirections within the server. These functionalities are furthermore exploited by cybercriminals in order to try to infect terminals.

In a following detection step E1, the monitoring device 40 verifies whether the current resource, which appears in the current request, is present in a database of malicious resources. Such databases list signatures of URLs associated with known malicious resources on the Internet. It is therefore verified whether the signature of the current resource appears in the database.

In a first case (branch "nok" in FIG. 1) where the current resource does not appear in the database of the malicious network resources, thus indicating that the request is legitimate in the sense that it relates to a resource which is not referenced as malicious, the request is re-transmitted onto the network by the monitoring device, in a transmission step E2, in order to be processed. The current resource requested is then added to a history of requests in a step E3 for updating the history of the requests. The method then continues in the receiving step E0, waiting for a next request. The history of the requests is intended to store the legitimate requests, in other words those that relate to legitimate resources, sent from the terminal over a given supervision time interval. The history therefore relates to requests prior to the current request. The history is also intended to verify, for any new request to a malicious resource which comprises in its header a reference to an initial resource, whether the new request is linked, via the reference field, to a prior legitimate request, sent in the recent past from the terminal and which relates to the initial resource. In this case, the new request which relates to a malicious resource is only the result of an attempt to infect the terminal. Indeed, the initial request relates to a resource which comprises a link, or a redirection, to the malicious resource. The addition of the malicious resource was able to be achieved by the cybercriminal by exploitation of a vulnerability of the server contacted, the hijacked use of advertisement networks, etc. In the case where the new request is not linked via the reference field to an initial request sent from the terminal, then the new request is due to an infection of the terminal. This is a spontaneous request, probably coming from a malware program installed on the terminal of the user and independent of the requests recently sent from the terminal. The use and the management of the history thus allows the analysis of the requests relating to malicious resources to be refined and the request to be sorted between those that are due to infection attempts and those that are due to real infections of the terminal. Thus, no alarm is raised in the case of indirect requests, in other words subsequent to redirections or links within a server, notably allowing the number of false positives to be reduced.

The management of a history of requests is justified by the fact, on the one hand, that it is necessary to identify links between several requests sent from a terminal with the aim of identifying legitimate links between requests, and/or redirections toward malicious resources independent of the terminal, and, on the other hand, by the fact that the information contained in the reference field of a request cannot be considered as reliable in the case of malware programs Indeed, a cybercriminal can readily create a malware program which, in requests generated without the knowledge of the user, systematically positions the reference field at a value associated with a popular site, in such a manner as to make it seem that the application having generated the request has followed a link provided by this popular site. In one naive approach, where the requests which comprise a field referring to a legitimate resource were systematically removed from the analysis owing to their reference to a previous request, this would allow a malware program to avoid being detected and to continue to send out requests until a request to a malicious site were successful. It is therefore necessary to go further than a simple verification of the presence of a reference field in this case and to verify that the initial request really has been generated by the terminal in the recent past.

One exemplary embodiment of the step E3 for updating the history is described hereinbelow in relation to FIG. 2a.

In a second case (branch "ok" in FIG. 1) where the current resource requested from the terminal appears in the database of known malicious resources, in an optional step E4 for blocking and sending a message, the monitoring device 40 blocks the request and sends an information message to the terminal indicating that the access to the resource has been refused. It should be noted that, at this stage, no alarm is sent to a security administrator in charge of the security of the terminal. Indeed, the current request relates to a resource identified as being malicious, it is blocked, but it cannot be said whether the request is due to an infection of the terminal or to an infection attempt. It is recalled that an innocent request generated by the terminal may lead to the loading of a page onto a server by the browser, which may include links or redirections to malicious resources. The aim of such a request may be to infect the terminal. In any case, the problem here is within the server and not within the terminal.

In a following verification step E5, the monitoring device 40 verifies whether the current request comprises in its header a reference to an initial resource. In other words, the monitoring device verifies whether the header of the current request comprises a reference field which comprises the initial resource.

In a first case (branch "nok" in FIG. 1) where the current request does not comprise in its header a reference to an initial resource, then an alarm is raised for the attention of the security administrator in a step E6 for sending an alarm. The alarm is intended to inform the administrator that the terminal is infected. Indeed, in this case, the request generated by the terminal is a direct request to a malicious resource via an application, for example the browser. In this example, the method continues in the receiving step E0, waiting for a next request. As a variant, the method halts, waiting for an analysis from the security administrator and for an implementation of remedial measures.

In a second case (branch "ok" in FIG. 1) where the request comprises in its header a reference to an initial resource, it is verified in a test step E7 whether the reference field which appears in the header of the current request belongs to the history of the resources.

In a first case (branch "ok" in FIG. 1), the initial resource which appears in the reference field of the current request appears in the history of the requests. This means that the initial resource has been requested from the terminal in at least one prior request in the recent past, more precisely during the supervision time interval. In this case, the current request constitutes an indirect request for access to the current malicious resource, probably coming from a redirection or from a link within a server or a website. This request is representative of an attempt to infect the terminal but in no case a real infection of the terminal, there is therefore no need to send an alarm to the administrator. The method continues at the step E0, waiting for a next request.

In a second case (branch "nok" in FIG. 1) where the initial resource which appears in the reference field does not appear in the history, indicating that the initial resource has not been requested by the terminal in a prior request during the supervision time interval, an alarm is raised for the attention of the security administrator during a step E8 for sending an alarm. Indeed, in this case, the reference field which appears in the current request is a bogus reference field: a cybercriminal has manipulated the current request on the terminal in order to introduce a reference field whose content is not linked to any prior request sent from the terminal. Such a manipulation is designed to make it seem like the request to the malicious resource is linked to a redirection within the server or a web server. In any case, the falsification of the request on the terminal by the cybercriminal is representative of an effective infection of the terminal, the cybercriminal having succeeded in manipulating the request. In this example, the method continues in the receiving step E0, waiting for a next request. As a variant, the method halts, waiting for an analysis from the security administrator and for an implementation of remedial measures, where needed.

In the example described here, a request to a malicious resource is blocked during the blocking step E4. In another exemplary embodiment, the request is not blocked. It may be desired to favor sending requests in order to avoid blocking a legitimate traffic. Indeed, it may be that the database of the malicious resources is erroneous and comprises a perfectly legitimate resource. The importance, in this case, of distinguishing an infection of the terminal from an infection attempt will be understood.

Examples of implementation of the step E3 for updating the history of the requests, and of the step E7 for searching the resource within the history will now be described in relation to FIGS. 2a and 2b, respectively.

Figure 2A:
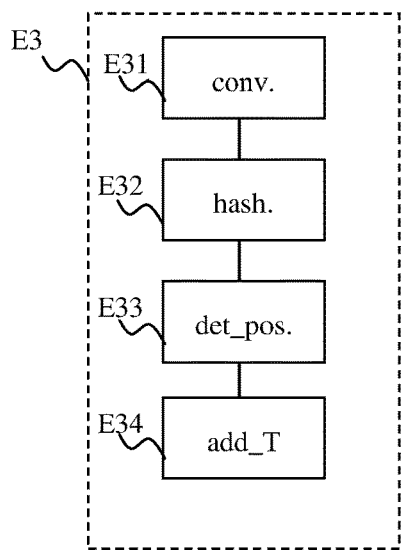
FIGS. 2a and 2b show exemplary embodiments of the steps for updating the history of the requests and for searching in the history.

The step E3 described in relation to FIG. 2a comprises a plurality of sub-steps. In this exemplary embodiment, the updating of the history of the requests are based on the use of the time-out Bloom filters. A Bloom filter is a compact probabilistic data structure designed to store a very large quantity of data in an optimal manner, and to be interrogated on the presence or the absence of a given element in the filter. More precisely, a Bloom filter is a table of n elements. Since these are time-out filters, the various elements of the table are designed to contain dates instead of a simple bit in the case of the standard Bloom filters. Recording a request, or more precisely a resource associated with a request, in the Bloom filter consists in calculating a plurality of positions in the filter based on the resource included in the request and in recording in this plurality of positions a timestamp value corresponding to the date of receipt of the request by the monitoring module 40. This timestamp value is representative of the latest date of access to the resource. It is known that Bloom filters are subject to false positives. Indeed, although it is known with certainty that an element is absent from the filter, it is only known with a certain probability that an element may be present in the filter. In order to reduce this number of false positives, due to possible collisions within the filter, several positions are calculated for each request. Thus, a request is associated with several positions in the filter.

In this exemplary embodiment, a time-out Bloom filter Tb is associated with the terminal, for example at the IP address of the terminal in an initial configuration phase (not shown in FIG. 2a). The filter Tb is a vector with n-elements, denoted Tb[0], . . . Tb[n−1], initialized at 0. In the example described here, n is fixed at twenty-five thousand.

In a first conversion sub-step E31, a current legitimate resource denoted x which appears in the current request is converted into a binary format. This conversion is obtained starting from the digital value of each of the characters composing the chain of characters representing the current resource. The binary value of the resource thus obtained is denoted b. For example, converters available on the Internet may be used.

In a following sub-step E32 for application of hash functions, k hash functions $Fp_i$, $1 \leq i \leq k$, are applied to the binary format b obtained during the preceding sub-step, allowing k fingerprints associated with the current resource x and denoted $E_i(x) = Fp_i(b)$ to be obtained. In the example described here, k is fixed at 3.

In a sub-step E33 for determining positions in the vector, k positions in the vector Tb are determined. These k positions are denoted $P_i$. The k positions are determined by the k fingerprints previously calculated, modulo the size of the vector Tb. In other words, $P_i(x) = E_i(x) \mod n$.

In a sub-step E34 for addition in the history, a current timestamp value $T_x$, corresponding to the latest date of access to the current resource x, or more precisely the date of receipt of the request by the monitoring device 40, is inserted into the vector Tb associated with the terminal, at the k positions $P_i(x)$ previously determined. In other words, $Tb[P_i(x)] = T_x$, for $1 \leq i \leq k$. For example, the time Posix, which expresses the number of seconds passed since the 1 Jan. 1970 is used to represent the current date $T_x$. The k positions in the filter therefore store the latest date of access to the current resource x.

Figure 3A:
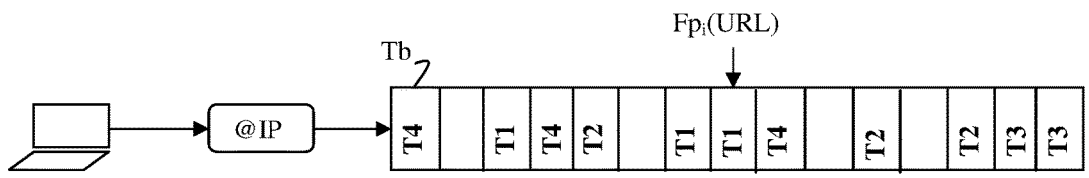
FIGS. 3a, 3b and 3c illustrate the use of Bloom filters for the implementation of the method according to various exemplary embodiments.

The association of a filter Tb with the terminal and the recording of dates of access to resources are illustrated schematically by means of FIG. 3a.

Figure 2B:
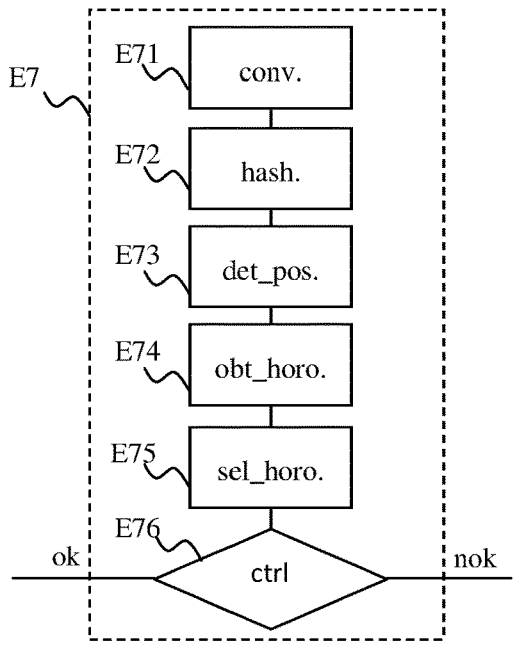

Once the filter Tb has been created, the step E7 for testing whether the reference field belongs to the history, described in relation to FIG. 2b, is implemented for any request to a malicious resource which comprises a reference field in its header. It is intended to verify that the access to an initial resource, denoted x', which appears in the reference field of the current request really has previously been requested from the terminal. "Previously" here means in the recent past which consists of the supervision interval. This supervision interval corresponds to the expiration period of the time-out Bloom filter Tb, or period of conservation within the filter. In the example described here, the expiration period is fixed at 5 minutes.

In a conversion sub-step E71, the function for conversion of a text into binary is applied to the initial resource x' which appears in the reference field of the current request in order to obtain a binary value b' for the initial resource.

In a following sub-step E72 for application of the hash functions, the k hash functions $Fp_i$ used during the updating of the history are applied to the binary value b' of the initial resource in order to calculate k fingerprints associated with the initial resource x', denoted $E_i(x') = FP_i(b')$.

In a sub-step E73 for determining positions in the filter, for the initial resource x', k positions denoted $P_i$ in the vector Tb are determined. The k positions are determined by the k fingerprints calculated during the sub-step E42, modulo the size of the vector Tb. In other words, $P_i(x') = E_i(x') \mod n$.

In a following step E74 for obtaining timestamp values, the k timestamp values appearing in the filter Tb at the k positions $P_i(x')$ calculated during the sub-step E73 are recovered. It should be noted that these timestamp values may not be identical. Indeed, in the case of collisions, a first and a second resource, requested at various times, have been able to allow the same position in the filter Tb to be calculated.

In this case, the timestamp value recorded at this position is necessarily that associated with the second resource and is later than those recorded at the other two positions calculated for the first resource.

In a following sub-step E75 for selection of a timestamp value, the various timestamp values associated with the resource x' and which appear at the k positions $P_i(x')$ in the filter Tb are compared with one another in order to only keep the lowest value, denoted $T_{MIN}$, which corresponds to the oldest date of recording of the initial resource in the filter. This comparison between the k timestamp values recorded allows any potential collisions to be taken into account during the calculation of the positions in the filter Tb. It should be noted that, if the earliest timestamp value $T_{MIN}$ is equal to zero, the initial resource has never been the subject of a request from the terminal. If it is different from zero, the earliest timestamp value $T_{MIN}$ corresponds, in principle, to the latest date of access from the terminal to the initial resource which appears in the reference field.

In a following verification sub-step E76, it is verified that the earliest timestamp value $T_{MIN}$ is different from zero, on the one hand, and, on the other hand, that the difference between a current date $T_{CURRENT}$ and the earliest timestamp value $T_{MIN}$ is less than the expiration period associated with the Bloom filter $T_{EXP}$. If these two conditions are met (branch "ok" in FIG. 2b) this means that the initial resource appears in the history. In other words, the initial resource, present in the reference field, has indeed been consulted from the terminal during the supervision interval. In the opposite case (branch "nok" in FIG. 2b) the initial resource does not appear in the history.

It should be noted that the expiration period $T_{EXP}$ of the filter Tb, which corresponds to the supervision interval, is used during the step E7 for testing whether a request belongs to the filter Tb but is not managed in the true sense during the updating of the filter. Indeed, the time-out Bloom filter is usually provided in order to eliminate entries when the latter have expired, in other words when they the timestamp values have exceeded the expiration date with respect to the current date. It has been chosen not to include this elimination step, not needed since, in the verification sub-step E76, the timestamp value of an entry is compared with the expiration date $T_{EXP}$. This allows the implementation of the method to be optimized in terms of processing time and of use of the memory.

In the example described here, the size of the time-out Bloom filter Tb is fixed at twenty-five thousand entries, the expiration period at five minutes and three hash functions are used. These values have been determined empirically and constitute a good compromise between elimination of the false alarms and optimization of the use of the memory. It is estimated that, with these values, ninety percent of the false alarms are eliminated. If the size of the history is increased, a higher rate of false alarms may be eliminated but memory problems are then the issue. If the expiration period is reduced, less false positives may then be filtered. If the number of hash functions is reduced, the number of collisions is increased and therefore the rate of false positives is increased. It should be noted that more hash functions could be used. It is indeed accepted that the use of seven hash functions allows two to three million entries to be stored in an optimal manner in a Bloom filter whose size is fixed and independent of the number of elements contained. However, it is estimated that three hash functions allow a uniform distribution of the storage of the timestamp values to be obtained and the gain by increasing the number of functions is not significant.

The Bloom filter is used with the aim of optimization of the storage and of speed of execution. It will be understood that such a structure is very advantageous for storing a large quantity of names of resources with variable sizes. It also has the advantage of respecting the anonymity of the users having generated the requests. Indeed, the filter is designed to store hashed values which do not allow information to be obtained on the resources effectively requested from the terminal.

It is possible for a cybercriminal to modify the reference field of the current request by introducing into the reference field a reference to an initial resource which has a good chance of appearing in the history of the requests. For example, the cybercriminal has modified the reference field of the current request by specifying a popular resource, such as "google.com", "facebook.com" or "yahoo.com", which has a good chance of being in the history of the requests. In this case, no alarm is raised and, in the example where the blocking step E4 is implemented, the request is blocked. In any case, there is a high probability of the next attempt by the cybercriminal being detected and leading to an alarm. There is however also a risk that a next current request, falsified by the cybercriminal, will comprise a current malicious resource which is not yet recorded in the database of malicious resources, thus allowing the cybercriminal to perpetrate their attack.

Figure 3B:
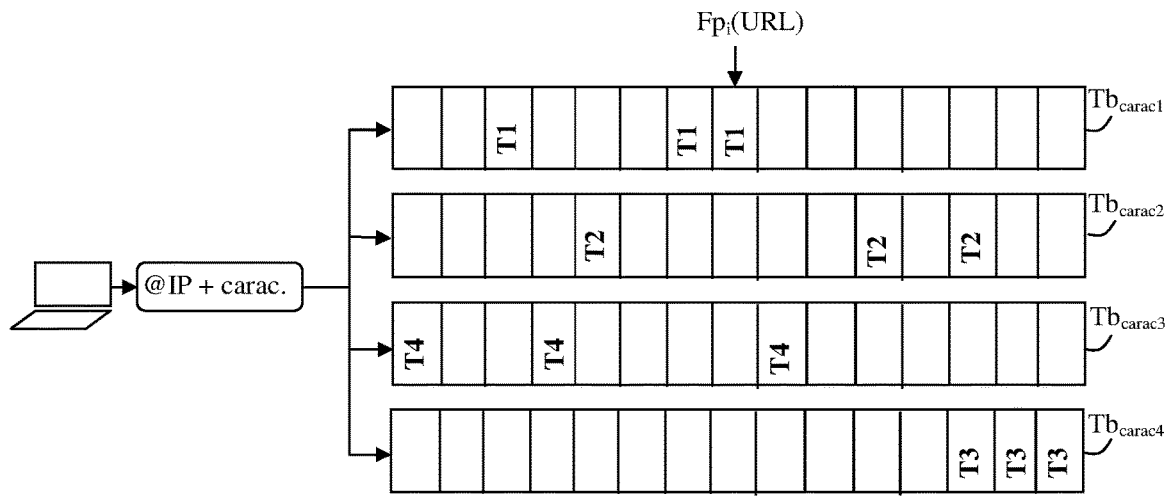

In order to cover this case, in another exemplary embodiment of the method, each resource request that comes from a terminal is contextualized in such a manner as to differentiate the origin of the request on the terminal according to for example the application responsible for the request. Thus, a much more detailed management of the history is applied. In this example, illustrated schematically in FIG. 3b, in addition to the IP address of the terminal, secondary characteristics specific to each of the requests and which appear in the header of the requests are taken into account. For example, the following fields may be used as secondary characteristics:

"User-Agent": this field indicates to the server for which the request is intended the name and the version of the client application responsible for the request. For example, the client application may be a web browser or an automated tool;

"Accept-Language": this field indicates the language, or the languages, by order of preference in which the user wishes to receive the response from the server following a request. It will be understood that this value may easily vary according to the nationality of the user of the terminal generating the request. On the other hand, if a cybercriminal creates a malware program designed to generate requests without the knowledge of the user of the terminal, there is a good chance that this field will be identical irrespective of the terminal that executes the malware program. There is therefore a good chance that this field varies depending on whether a request to a resource sent from the terminal is legitimate or illegitimate.

In this exemplary embodiment, for each terminal a plurality of contexts is created specific to the IP address of the terminal and to one or more fields of the request in order to refine the filter. Thus, for a given terminal, p-filters for p different values of the selected field are potentially created. This embodiment allows the histories specific to various applications which are executed on the terminal to be clearly dissociated. However, this necessarily involves a higher memory load.

Figure 3C:
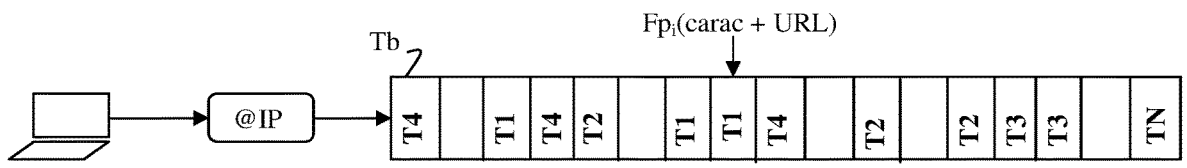

In order to overcome this drawback, in another exemplary embodiment, a single history is managed for the header field or fields taken into account as secondary characteristics. In this example, illustrated schematically by means of FIG. 3c, according to the step E3 for updating the history, the value of the selected field is combined with a current legitimate resource intended to be recorded in the history, prior to making use of hash functions for calculating the associated positions in the vector Tb. In this example, a single history is managed for storing all of the requests coming from a terminal identified by its IP address, while at the same time distinguishing in the vector associated with the history the various fields taken into account. In one exemplary embodiment, the selected field and the current legitimate resource are concatenated prior to the implementation of the conversion sub-step E31. It will be understood that, in order to implement this exemplary embodiment, the history must be dimensioned accordingly. In particular, it requires more memory space than in the preceding exemplary embodiment, in which a history is associated with each field selected. However, since the history is unique, the memory to be allocated to it may be reserved statically.

In all the exemplary embodiments previously described, the monitoring device 40 is a separate device of the terminal. This may be a filtering device designed to filter the traffic from a plurality of terminals of a local network or of a company network. In this case, the security administrator is a security administrator of the local network or of the company network. The invention is not limited to this exemplary embodiment. Thus, in another example, the monitoring device 40 is a software monitoring module integrated into a software application of the anti-virus type, installed on the terminal. In this case, the administrator who is alerted in a case of infection may be the user of the terminal.

The method described here allows the direct accesses to malicious resources to be distinguished from the indirect accesses to these same resources. The direct accesses are associated with infections of the terminal, whereas the indirect accesses are associated with attempts to infect the terminal. These infection attempts, detected, or even curbed, do not give rise to alarms and thus allow alarms to be raised only for the detection of a real infection of the terminal. Thus, the reliability of the infection detection is improved.

A monitoring device 40, according to one exemplary embodiment, will now be described in relation to FIG. 3.

The monitoring device 40 is configured for monitoring a network traffic coming from a computer terminal and destined for a network, such as the Internet, and for assisting the detection of an infection of the terminal by a malware program. In one exemplary embodiment, the monitoring device 40 is a unit of traffic filtering data processing equipment, positioned in the network, such as a filtering gateway. The filtering device 40 comprises a software module configured for implementing the steps of the method for assisting the detection of infection of a terminal by a malware program, such as previously described.

The monitoring device 40 comprises:
a processing unit or processor 401, or "CPU" (for "Central Processing Unit"), designed to load instructions into memory, to execute them, to carry out operations;
an assembly of memories, with one volatile memory 402, or "RAM" (for "Random Access Memory") used for executing code instructions, storing variables, etc., and a storage memory 403 of the "EEPROM" (for "Electrically Erasable Programmable Read Only Memory") type. In particular, the storage memory 403 is configured for storing a software module for assisting the detection of infection of a terminal by a malware program which comprises code instructions for implementing the steps of the method for assisting the detection of infection of a terminal such as previously described.

The monitoring device 40 also comprises:
a receiver module 404, configured for receiving a current request for access to a resource coming from the terminal and destined for a server of the network. The receiver module 404 is configured for implementing the step E0 of the method for assisting the detection of infection of a terminal such as previously described;
a detection module 405, configured for detecting that the resource which appears in the current request is a malicious resource. The detection module 405 is thus designed to verify whether the resource requested belongs to a database of malicious resources known to the network. The detection module 405 is configured for implementing the test step E1 of the method for assisting the detection of infection of a terminal such as previously described;
a verification module 406, configured for verifying, when the current request comprises a reference to an initial resource, that an access to the initial resource has been requested from the terminal in at least one prior request. The initial resource having furthermore been detected as legitimate, the current request is considered as an attempt to infect the terminal. The verification module 406 is configured for implementing the step E7 for testing whether the reference field belongs to the history of the method for assisting the detection of infection such as previously described.

In one exemplary embodiment, the monitoring device 40 also comprises a module for alerting the administrator (not shown in FIG. 4), designed to warn the administrator of the network of the presence of an infection. An alarm for the attention of the administrator may be sent in various ways: sending of an e-mail, sending of an "sms" (for "short message service"), notification in a log file, display of an alarm page when browsing the web or on a portal, insertion of an alarm message in a web content visited, etc.

The receiver module 404, detection module 405 and verification module 406 are preferably software modules comprising software instructions for implementing the steps of the method for assisting the detection of infection of a terminal previously described.

The invention therefore also relates to:
a computer program comprising instructions for the implementation of the assistance method previously described when this program is executed by a processor of the monitoring device 40,
a readable recording medium on which the computer program described hereinabove is recorded.

In the example described here, the monitoring device 40 is a unit of data processing equipment of the filtering gateway type positioned in the network. The invention is not limited to this type of equipment. Thus, in another exemplary embodiment, the monitoring device 40 is integrated into a user terminal which comprises the software modules configured for implementing the steps of the method for assisting the detection of infection of the terminal previously described. For example, these modules are included in an antivirus software or in an anti-malware software installed on the terminal. In this case, the administrator alerted of the infection of the terminal may be the user.

An exemplary embodiment of the invention overcomes the shortcomings/drawbacks of the prior art and/or to provide improvements to them.

Although the present disclosure has been described with reference to one or more examples, workers skilled in the art will recognize that changes may be made in form and detail without departing from the scope of the disclosure and/or the appended claims.

The invention claimed is:

1. A method for assisting detection of infection of a terminal by a malware program, comprising the following acts performed by a device on a data network:
   receiving over the network a current request, coming from the terminal, for access to a resource of the network,
   detecting that the resource requested is present in a database of malicious resources,
   when a header of the current request comprises also a reference to an initial resource, verifying that an access to the initial resource has been requested from the terminal in at least one prior request, said initial resource having been detected to be legitimate during processing of the prior request, said current request then being considered as an attempt to infect the terminal.

2. The method as claimed in claim 1, comprising, when the initial resource whose reference is included in the current request has not been requested by the terminal in a prior request during a supervision time interval, transmission of an alarm representative of an infection of the terminal.

3. The method as claimed in claim 1, comprising, when the resource requested is a legitimate resource, recording said resource in association with a current timestamp value representative of a latest date of access to the resource.

4. The method as claimed in claim 3, in which the resource is recorded in a history of requests, the recording of the resource comprising:
   applying at least one hash function to a current binary value associated with the resource,
   determining at least one current position in a time-out Bloom filter based on said current binary value, said filter being associated with the terminal and equivalent to the history of the requests, and
   recording the current timestamp value at said current position of the filter.

5. The method as claimed in claim 4, in which the verifying comprises a search of an initial resource in the filter, which comprises:
   applying the hash function to an initial binary value associated with the initial resource,
   determining at least one position in the Bloom filter based on said initial binary value,
   selecting, from amongst the at least one position, of the position in the filter which comprises the earliest timestamp value,
   when the time period included between the earliest timestamp value and a current date is less than an expiration time associated with the filter, indication that the initial resource appears in the history.

6. The method as claimed in claim 4, in which the Bloom filter is associated with the terminal and with at least one field included in a header of the current request.

7. A device for assisting monitoring of network traffic, configured for assisting detection of infection of a terminal by a malware program, said device comprising:
   a processor; and
   a non-transitory computer-readable medium comprising instructions stored thereon, which when executed by the processor configure the device to perform acts comprising:
   receiving over the network a current request, coming from the terminal, for access to a resource of the network,
   detecting that the resource requested is present in a database of malicious resources,
   verifying, when a header of the current request also comprises a reference to an initial resource, that the access to the initial resource has been requested from the terminal in at least one prior request, said initial resource having been detected to be legitimate during processing of the prior request, said current request then being considered as an attempt to infect the terminal.

8. A user terminal comprising the monitoring assistance device as claimed in claim 7.

9. A non-transitory computer-readable medium comprising a computer program stored thereon, the program comprising portion of code for executing a method for assisting detection of infection of a terminal by a malware program, when the portion of code is executed by a processor of a device on a data network, wherein the method comprises the following acts performed by the device:
   receiving over the network a current request, coming from the terminal, for access to a resource of the network,
   detecting that the resource requested is present in a database of malicious resource,
   when a header of the current request also comprises a reference to an initial resource, verifying that an access to the initial resource has been requested from the terminal in at least one prior request, said initial resource having been detected to be legitimate during processing of the prior request, said current request then being considered as an attempt to infect the terminal.

* * * * *